(12) United States Patent  
Hasegawa et al.

(10) Patent No.: US 7,951,960 B2
(45) Date of Patent: May 31, 2011

(54) BLACK COLOR MATERIAL AND TONER

(75) Inventors: Shinji Hasegawa, Kanagawa (JP); Minquan Tian, Kanagawa (JP); Yuka Ito, Kanagawa (JP); Kazuhiko Hirokawa, Kanagawa (JP); Miho Watanabe, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 110 days.

(21) Appl. No.: 12/241,120

(22) Filed: Sep. 30, 2008

(65) Prior Publication Data

US 2009/0240065 A1    Sep. 24, 2009

(30) Foreign Application Priority Data

Mar. 24, 2008  (JP) .................................. 2008-075913

(51) Int. Cl.
C07D 207/325 (2006.01)
G03G 9/09 (2006.01)
(52) U.S. Cl. .................................. 548/540; 430/108.21
(58) Field of Classification Search ............. 430/108.21; 548/540
See application file for complete search history.

(56) References Cited

U.S. PATENT DOCUMENTS 7,083,675 B2   8/2006  Mizuguchi et al.
7,105,046 B2   9/2006  Mizuguchi et al.

FOREIGN PATENT DOCUMENTS

DE    3246319 A1  *  6/1984
JP    2003-41144 A     2/2003
JP    2003-41145 A     2/2003

OTHER PUBLICATIONS

DE3246319, English Abstract, 1984.*
Handbook on Organic Pigments (Color Office (2006), pp. 613-617).
Angewandte Chemie International Edition in English (vol. 4, No. 8. p. 164 (1965)).
Daniel E. Lynch, et al. "The synthesis and non-linear optical properties of (N-alkylpyrrol-2-yl) squaraine derivatives" Journal of the Chemical Society-Perkin Transactions II (pp. 827-832 (1997)).

* cited by examiner

*Primary Examiner* — Yong Chu
(74) *Attorney, Agent, or Firm* — Sughrue Mion, PLLC

(57) ABSTRACT

The black color material includes a condensation product of a pyrrole compound represented by the following formula (1) and a squaric acid represented by the following formula (2):

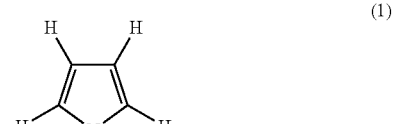

(1)

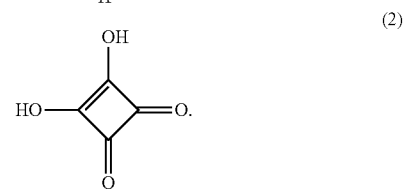

(2)

7 Claims, 2 Drawing Sheets

BLACK COLOR MATERIAL AND TONER

CROSS-REFERENCE TO RELATED APPLICATIONS

This application is based on and claims priority under 35 U.S.C. 119 from Japanese Patent Application No. 2008-075913 filed Mar. 24, 2008.

BACKGROUND

1. Technical Field

The present invention relates to a black color material and a toner.

2. Related Art

Substances known as black color materials for use in information recording material, such as an electrophotographic toner and an ink for inkjet printer, include carbon black, aniline black, black iron oxide, black titanium oxide and soon. In addition to information recording material, these black color materials are being utilized as materials imparting a black color or light-shielding property to a light-shielding black glass, a black matrix material for a plasma display and a liquid crystal display, an agricultural lightshielding film and so on.

A color material is generally used in a mixture with a binder such as a resin. Upon consideration of dispersion stability at a mixing stage in the manufacturing process and during the storage, it is desired that the specific gravity of the binder be nearly the same as the specific gravity of the color material. Therefore, an organic black color material including an organic substance akin to binder has high industrial utility values.

Carbon black is an organic pigment having a high color density (coloring per unit weight), a high blackness degree and high light fastness.

SUMMARY

According to an aspect of the invention, there is provided a black color material, comprising a condensation product of a pyrrole compound represented by the following formula (1) and squaric acid represented by the following formula (2).

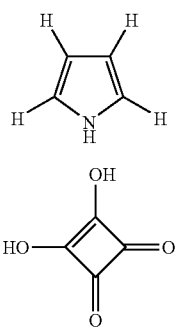

BRIEF DESCRIPTION OF THE DRAWINGS

Exemplary embodiments of the present invention will be described in detail based on the following figures, wherein.

DETAILED DESCRIPTION

Black Color Material

Figure 1:
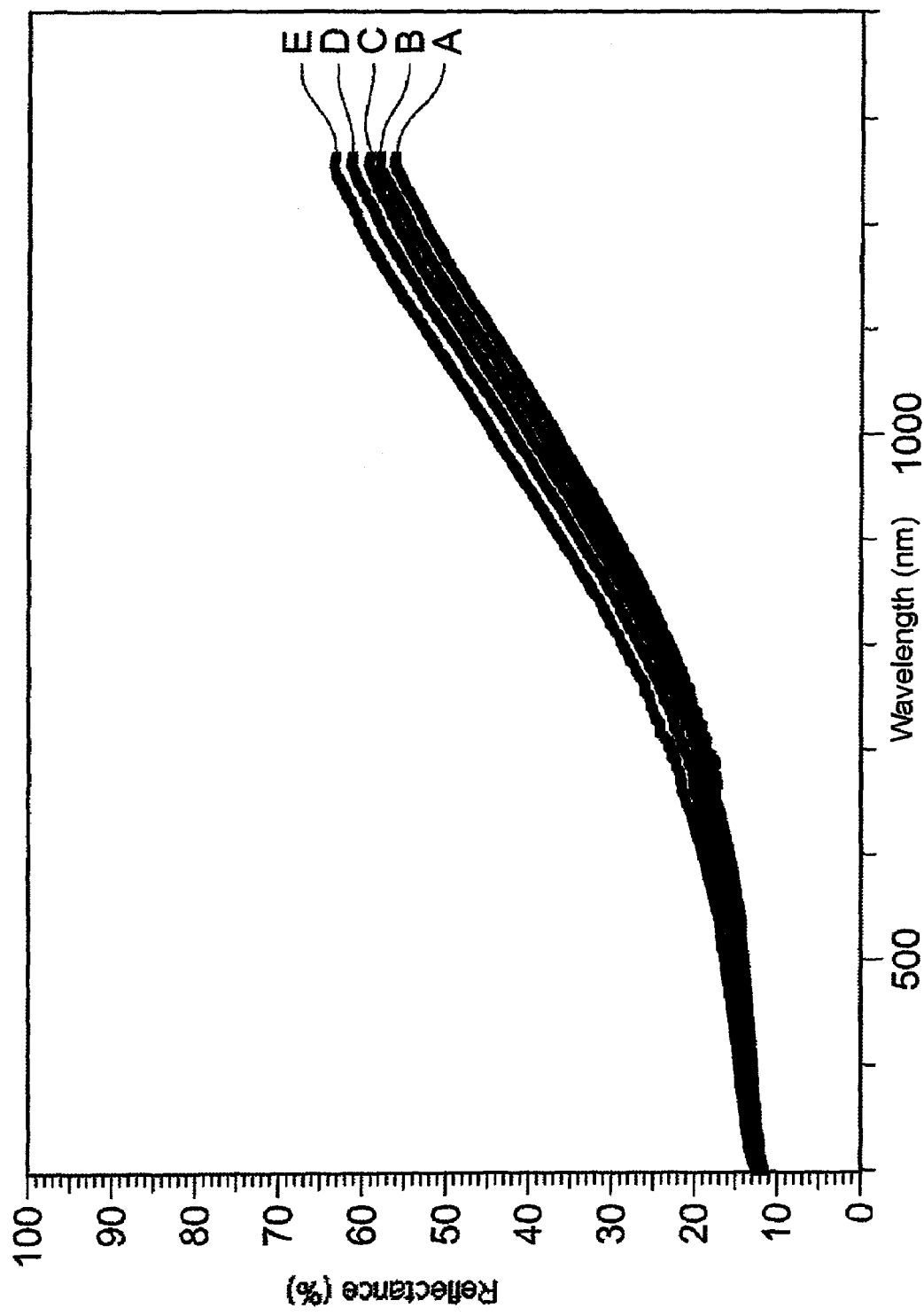
FIG. 1 displays the reflection spectra of paper provided with the resin film in which the black color material produced in Example 1.

The present black color material is characterized by having as its constituent a condensation product of a pyrrole compound represented by the following formula (1) and a squaric acid represented by the following formula (2) (hereinafter referred to as "the condensation product relating to the invention" too).

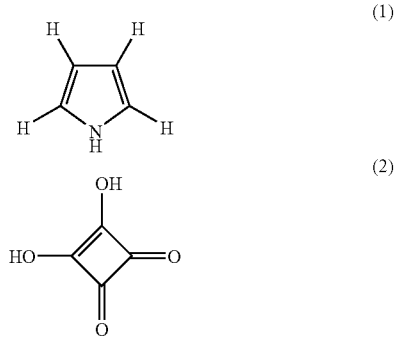

Exemplary embodiment of the condensation product included in the present black color material is a product synthesized by reaction between the pyrrole compound and the squaric acid in a water-containing reaction solvent. This case is effective at providing a black color material having enhanced blackness degree and light fastness.

The expression "water-containing reaction solvent" as used herein represents a reaction solvent into which water is incorporated intentionally, which is distinguished from a reaction solvent temporarily having water produced by condensation reaction between the pyrrole compound and the squaric acid. More specifically, it is usual for the condensation reaction between a pyrrole compound and a squaric acid to be made to proceed while removing water produced in a nonaqueous solvent. By contrast, the black color material according to this exemplary embodiment has a condensation product produced by condensation reaction in an aqueous reaction solvent, whereby this black color material can effectively produce the effects intended by the invention.

Polypyrrolosquarylium condensation products are publicly known in the literature Angewandte Chemie International Edition in English, Volume 4, Issue 8, 1965, 694. However, this literature merely has a description that the condensation products have a blue-green color, and it has neither description nor suggestion about use of the condensation products as black color materials. In addition, the condensation product relating to the invention is formed by reaction between the pyrrole compound and the squaric acid in a water-containing reaction solvent, whereas the condensation products described in the literature are products formed in a water-removing reaction solvent. Since there is a distinct difference between these two reaction systems, it can be said that the products formed, namely the condensation products, differ from each other.

The condensation product relating to the invention may be produced, e.g., by the following method. The pyrrole compound represented by formula (1) and the squaric acid represented by formula (2) are dissolved in a water-containing reaction solvent, and thereto a catalyst is added to prepare a reaction solution. Then, this reacting solution is reacted under predetermined conditions, thereby yielding the condensation product relating to the invention as black precipitates.

The water content in the water-containing reaction solvent is preferably 10% by mass or above, more preferably 20% by mass or above, to provide the condensation product showing absorption of light over the whole visible region. The solvent other than water may be any solvent in which both the pyrrole compound and the squaric acid are dissolved. Examples of such a solvent include ethanol, methanol, isopropanol and the like. One example of preferred reaction solvents is hydrous ethanol. For enhancing the efficiency of condensation product recovery by precipitation and filtration, it is appropriate that the water content in aqueous ethanol be from 15% by mass to 40% by mass.

Examples of the catalyst include perchloric acid and para-toluenesulfonic acid.

The exemplary amounts of the pyrrole compound and the squaric acid prepared for the reaction is the molar ratio of the pyrrole compound to the squaric acid (pyrrole compound/squaric acid ratio) is from 0.5 or about 0.5 to 2 or about 2. And it is preferable that the pyrrole compound and the squaric acid are prepared in approximately equimolecular amounts.

The reaction conditions of the reacting solution are, e.g., as follows: First, the reacting solution is kept at a temperature of 40° C. or about 40° C. to 80° C. or about 80° C. for 0.5 or about 0.5 to 8 or about 8 hours. Then, the resulting solution is kept at a temperature of 10° C. or about 10° C. to 40° C. or about 40° C. for 2 or about 2 to 2,000 or about 2,000 hours. Incidentally, the reaction conditions may be adjusted as appropriate so that the black condensation product can be produced in a good yield.

The condensation product relating to the exemplary embodiment of the invention takes the form of fine particles ranging in size from about 20 to 400 nm. Such fine particles of the condensation product may reduce light scattered from the particle surfaces, whereby the color density may be increased, and also may keep high dispersibility in a medium, such as water, a vehicle or a polymeric resin, with using a general dispersant such as a surfactant.

When the present black color material is used for application to information recording materials, it is preferable that the condensation product relating to the invention has its median diameter (d50) in a range of about 50 nm to 350 nm.

The present black color material may be used in a state of being mixed into a vehicle, a binder resin or the like. Examples of a binder resin usable therein include organic binder resins, such as polyester and styrene-acrylic copolymers, and examples of a vehicle usable therein include natural vegetable oils, rosin, solutions prepared by dissolving various kinds of synthetic resins in organic solvents, and water dispersions of various kinds of synthetic resins.

By combined use of the present black color material and the organic binder resin as recited above, a differential between specific gravities of each ingredient may be minimized. So, the resulting combination may have an increased stability in its quality. For example, it may resist alteration, such as separation of elements, during manufacturing and storage.

The present black color material has high light fastness, high color density and high blackness degree because of its broad absorption band in the visible region, so it is useful as a black color material for incorporation into image forming materials.

Up to now there have been many cases where carbon black has been used as the pigment in electrophotographic black toner used in copiers and the like. However, the addition of carbon black in a large amount adversely affects the chargeability of the toner. On the other hand, mixed CMY black and calcined perylene black pigments are lower in color density than carbon black. By contrast, the present black color material has a high color density and a high blackness degree, so it may be used as a substitute for carbon black and allows realization of a black toner substantially superior in color density even though the toner is a non-carbon-black or low-carbon-black system, which can not be attained by mixed CMY black, calcined perylene black pigments and so on. In addition, this black toner can have higher light fastness as compared with the case of using mixed CMY black.

Additionally, aniline black has sufficient blackness degree, but low light fastness. On the other hand, the perylene pigments has low color density and mixed CMY black is lower in blackness degree. Therefore, increase in color material content is required for achievement of the color performance by use of those color materials. However, there are cases where secondary impairments (e.g., in chargeability and production suitability of toner) due to the increased contents become problems. By contrast, the present black color material has a high color density and may meet blackness degree and weather resistance requirements at higher levels than organic color materials as carbon black substitutes, such as aniline black, perylene pigments and mixed CMY black. So, the present black color material may resolve those problems.

In addition, the present black color material is also useful for optical filters and light-shielding resin films, because it is an organic black color material sufficient in both light fastness and blackness degree.

Next, preferred embodiments of the toner as an example of use of the present black color material as an image forming material are described in detail.

(Toner)

The toner as an exemplary embodiment of the invention is an electrophotographic toner which contains the present black color material and a binder resin (binder), together with, if necessary, a colorant other than the present black color material, an infrared absorbent, an charge controlling agent and a wax.

The binder resin of the toner is not limited to particular one, and any of thermoplastic resins including various kinds of natural or synthetic polymers may be used. For example, an epoxy resin, a styrene-acrylic resin, a polyamide resin, a polyester resin, a polyvinyl resin, a polyolefin resin, a polyurethane resin and a polybutadiene resin, having a weight-average molecular weight of about 1,000 to 100,000 and a melting point of from 50° C. or about 50° C. to 250° C. or about 250° C., may be used singly or as mixtures of two or more. Of these resins, a styrene-acrylic resin and a polyester resin in particular are preferable in consideration of dispersibility of color material and heat fixing efficiency.

When a combination is made with the present black color material and the organic binder resin(s) as recited above, their specific gravities may approach. Therefore, the resulting toner may have the effect of increasing in stability of its quality, for example, an effect of resisting alteration, such as separation of elements, during manufacturing and storage.

In the toner according to this exemplary embodiment, from the viewpoint of obtaining satisfactory charging characteristics and heat fixing efficiency, the proportion of the black color material related to the invention and the binder resin(s) are such that the black color material related to the invention is preferably contained in amount of from 1 or about 1 to 15 or about 15 parts by mass with respect to 100 parts by mass of the binder resin(s), more preferably from 3 or about 3 to 10 or about 10.

Colorant other than the present black color material is not limited to particular ones, and they may be any of dyes, pigments and the like. In the case of black toner, for example, the colorant may be used in combination of carbon black and mixed CMY black.

The content of colorant other than the present black color material is preferably from 1 or about 1% by mass to 15 or about 15% by mass, more preferably from 3 or about 3% by mass to 10 or about 10% by mass, based on the total mass of the toner.

When the toner according to this exemplary embodiment is used as a flash fixable toner, it may include an infrared absorbent. Examples of an infrared absorbent usable therein include an aluminum salt, an indium-oxide type metal oxide, a tin-oxide type metal oxide, a zinc-oxide type metal oxide, a cadmium stannat, a specific amide compound, a naphthalocyanine/phthalocyanine compound, a cyanine compound, and a lanthanide compound. In addition to these compounds, black pigments including carbon black, titanium black, ferrite, magnetite and zirconium carbide may also be used. These infrared absorbents may be used singly or as a mixture of two or more thereof.

The charge controlling agent is not particularly restricted so long as it has an ability to impart electrostatic charge to the toner. For example, a quaternary ammonium salt, a Nigrosine dye, a triphenylmethane derivative and so on may be used suitably as a positive charge controlling agent, while a naphtholic acid-zinc complex, a salicylic acid-zinc complex, a boron compound and so on may be used suitably as negative charge controlling agents. Depending on the chemical species, such charge controlling agents are generally added in an amount of the order of 1 to 10% by mass, with respect to the total mass of the toner.

As to the wax, a wide variety of wax materials including natural waxes and synthetic waxes may be used. For example, petroleum waxes including paraffin wax, microcrystalline wax and the like, mineral waxes including Fischer-Tropsch wax, montan wax and the like, vegetable waxes including carnauba wax and the like, animal waxes including bees wax, lanolin and the like, synthetic waxes including polyolefins, such polyethylene and polypropylene, fatty acid esters, amide wax, modified polyolefins and the like, and other compounds including terpene compounds, polycaprolactone and so on may be widely used singly or as mixture of two or more thereof. Depending on the type, such wax is generally added in an amount of the order of 1 to 10% by mass with respect to the total mass of the toner.

To the toner according to this exemplary embodiment, an external additive may be added. Commonly-used various materials may be used as the external additive, with examples including inorganic fine particles, such as silica, titania, alumina and zinc oxide, hydrophobized products of those inorganic fine particles, and resin particles, such as polystyrene, PMMA or melamine resin.

The toner according to this exemplary embodiment may be made by a common method for toner making. A few examples of such a method are described below.

In the case of making the toner by a crushing method, toner constituents including a binder resin and the present black color material and further, when required, a colorant other than the present black color material, an infrared absorbent, wax, an charge controlling agent and so on are mixed together, and then melt-kneaded by a kneader, an extruder or the like. Thereafter, the melt-kneaded substance is coarsely crushed, and then finely crushed with a jet mill or the like, and further classified by an air classifier, thereby yielding toner particles of a desired particle size. Furthermore, external additives are added to the toner particles. Thus, final toner is completed.

The toner may also be prepared by a polymerization method. To this case, a suspension polymerization method and an emulsion polymerization method are mainly applicable. The present black color material may assume a form of a water-dispersed slurry which is suitable for processes of the emulsion polymerization method. Therefore, the toner according to this exemplary embodiment is especially preferred a chemical toner, based on the emulsion polymerization method.

In the case of prepare the toner by a suspension polymerization method, a monomer composition is prepared by mixing a monomer such as styrene, butyl acrylate or 2-ethylhexyl acrylate, a cross-linking agent such as divinylbenzene, a chain transfer agent such as dodecyl mercaptan, the present black color material, a polymerization initiator, and further, when required, a colorant other than the present black color material, an charge controlling agent, an infrared absorbent and wax. Then, the monomer composition is charged into an aqueous phase containing a suspension stabilizer, such as tricalcium phosphate or polyvinyl alcohol, and a surfactant, and an emulsion is prepared by a rotor-stator emulsion machine, a high-pressure emulsion machine or an ultrasonic emulsion machine, and the monomer is polymerized by heating. After the polymerization, obtained particles are washed and dried, and thereto external additive is added. Thus, final toner particles are obtained.

In the case of prepare the toner by an emulsion polymerization method, resin particles are prepared by adding a monomer, such as styrene, butyl acrylate or 2-ethylhexyl acrylate, and a surfactant, if required, such as sodium dodecylsulfonate, to water in which a water-soluble polymerization initiator, such as potassium persulfate, is dissolved, and the mixture is polymerized under heating with stirring, thereby obtain resin particles. Then, particles of an infrared absorbent, wax and so on are added to the suspension in which the resin particles are dispersed, and these particles are subjected to heterogeneous agglomeration by controlling the pH, stirring strength and temperature of the suspension. Further, the thus prepared heterogeneous agglomerates are fused by heating at a temperature equal to or higher than the glass transition temperature of the resin, whereby toner particles are formed. Thereafter, the toner particles are washed and dried, and thereto external additive is added. Thus, final toner particles are obtained. Coloring of the toner particles may be performed, after the fusion of the heterogeneous agglomerates, then mixing them with a slurry prepared by dispersing the present black color material and, if desired, a colorant other than the present black color material into water, and by causing an agglomerating with a polyvalent metal flocculant, or it may be performed by agglomerating the present black color material, together with a colorant other than the present black color material, concurrently with the formation of heterogeneous agglomerates.

The toner according to this exemplary embodiment may be used as a one-component developer as it is, or as a two-component developer by mixing with a carrier. Examples of a carrier usable in the two-component developer as publicly known include magnetite, ferrite and iron powder.

The toner according to this exemplary embodiment is suitable as a black toner because the present black color material has a broad absorption band in the visible region, a high color density and high blackness degree. In addition, even when the content of the present black color material in the black toner is adjusted to a range of from 3 or about 3 to 10 or about 10% by mass with respect to the binder resin since the colorant content in toner is generally in such a range, the resulting black toner has viewability superior to the black toner containing mixed CMY black as its colorant. In this case, it also becomes possible to realize a black toner which is a non-carbon-black or low-carbon-black system, yet excels in charge characteristics and in color density. In addition, because the present black color material excels in light fastness, the black toner according to this exemplary embodiment may obtain an improvement in storage stability such that the toner image formed on a medium such as paper resists fading. Further, the black toner according to this exemplary embodiment may obtain improvements in suitability for toner making and storage stability because a differential between specific gravities of the black color material and an organic binder resin can be lessened.

EXAMPLES

The invention is described below in more detail by reference to the following examples, but these examples should not be construed as limiting the scope of the invention.

Production of Black Color Material

Example 1

A reacting solution is prepared by dissolving equimolecular amounts of unsubstituted pyrrole (1.077 mL) represented by the following formula (1) (P0574, product name code, manufactured by Tokyo Chemical Industry Co., Ltd.) and a squaric acid (0.881 g) (manufactured by KYOWA HAKKO KOGYO Co., Ltd.) in ethanol containing 20% by mass of water, and further adding thereto 31.7 mL of 70% perchloric acid as a catalyst (manufactured by Wako Pure Chemical Industries, Ltd.). This reacting solution is warmed in an oil bath and kept at 40° C. for 2 hours. Then, the resulting solution proceeds with reaction at room temperature for 17,000 hours. Thereafter, black precipitates are removed from the reacting solution by filtration, washed with ethanol and distilled water, and then dried.

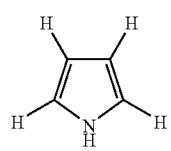

(1)

Crushing of the black precipitates thus obtained are carried out by placing 30 mg of the black precipitates, 500 µL of n-hexane and 10 g of 0.3-mm-φ zirconia balls in a mill pot made from zirconia, and milling them by using a planetary ball mill (Type P7, made by Fritsch) at 800 rpm for 1 hour. The crushed matter is collected with distilled water, filtered, further washed with distilled water, and then dried. Thus, a black color material of Example 1 is obtained.

(Preparation of Slurry)

The thus obtained black color material (crushed matter) in an amount of 4.8 mg, 24 µL of sodium dodecylbenzenesulfonate diluted to 12% by mass and 2.88 mL of distilled water are mixed together, and dispersed by using an ultrasonic homogenizer (VC-130, made by SONICS & MATE-RIAL INC., use of a ¼ inch horn, ice cooling, 4 W output power, 60 minutes), there by preparing a black slurry (pigment (black color material) concentration: 0.166% by mass). In addition, particle sizes of the color material in the slurry, which are represented by the value of a median diameter (d50), are measured with a particle size distribution meter (LB-550, made by HORIBA Ltd.). The median diameter (d50) of the fine particles obtained is 300 nm.

(Measurements of Optical Density and Chroma)

Under assumption that the black color material obtained in Example 1 is used as a constituent of the toner, the optical density and the chroma are evaluated under the following procedure.

First, 261 µL of the black color material-containing slurry prepared in advance (black color material concentration: 0.165% by mass), 15 µL of an aqueous dispersion solution of styrene-acrylic resin latex (an aqueous solution in which a resin produced by emulsion polymerization of styrene, n-butyl acrylate and acrylic acid in the presence of a surfactant is dispersed in a proportion of 40% by mass) and 5 g of distilled water are mixed together. And a mixed slurry is prepared by subjecting the resulting mixture to dispersion treatment with an Ultratalax. Thereto, a polyvalent metal flocculant is further added, and mixed with stirring. Thus, a mixed dispersion liquid is prepared. Then, this mixed dispersion liquid is deposited on a filter paper (GSWP04700, manufactured by MILLIPORE, pore diameter: 220 nm) by filtration, and then subjected to thermocompression bonding at 120° C., thereby forming a resin film on the filter paper. Thus, a resin patch of Example 1A for color performance evaluations is obtained. Incidentally, this resin patch for color performance evaluations has a resin film containing the black color material and the styrene-acrylic resin latex in the total per-square-meter gram number (TMA) of 4.5 g/m$^2$ (the total solids mass per square meter), wherein the amount of the black color material (PMA) is 0.3 g/m$^2$ (corresponding to 6.7% by mass in terms of the proportion of the color material to the resin). On the resin patch thus made, optical density OD and chroma c* of the resin film are measured with a spectrodensitometer (x-rite 939, made by X-Rite, Inc.). The results obtained are shown in Table 1.

Another resin patch of Example 1B for color performance evaluations is made in the same manner as described above, except that the amount of the slurry used is changed to 404 µL (TMA=4.5 g/m$^2$, PMA=0.45 g/m$^2$ (corresponding to 10% by mass in terms of the proportion of the color material to the resin). On this resin patch also, optical density OD and chroma c* of the resin film are determined in the same way as described above. The results obtained are shown in Table 1.

In addition, optical density OD and chroma c* of the resin patch made using a slurry of mixed CMY black as a comparative example are shown in Table 1. Incidentally, the slurry of mixed CMY black is prepared in the same manner as the slurry prepared in Example 1, except that the color material mentioned below is used in place of the black color material produced in Example 1.

Mixed CMY black: Pigment prepared by mixing commercially available cyan, magenta and yellow pigments in proportions providing the blackest look when the sensory evaluation by visual observations is made, which has a median diameter d50 of 134 nm.

TABLE 1

| Color Material | Pigment (color material) Concentration (% by mass) | OD | c* |
|---|---|---|---|
| Example 1A | 6.7 | 1.0 | 3.8 |
| Example 1B | 10 | 1.3 | 3.3 |
| Comparative Example (Mixed CMY black) | 10 | 1.3 | 12.6 |

As shown in Table 1, the black color material produced in Example 1 is equal in optical density to the mixed CMY black, whereby the colorability is found to be sufficiently high. In addition, the black color material produced in Example 1 shows the c* value of 3.3 in the concentration of 10% by mass, which indicates that the present black color material has very high blackness degree (corresponding to c*) as compared with the mixed CMY black.

(Light Fastness Test and Reflection-Spectrum Measurement)

On one of the resin patches incorporating the black color material produced in Example 1 for color performance evaluations, the resin patch with TMA of 4.5 g/m² and PMA of 0.3 g/m² (corresponding to 6.7% by mass in terms of the proportion of the color material to the resin), a light fastness test under irradiation with a xenon lamp (Suntest XLS+, made by Toyo Seiki Seisaku-Sho, Ltd., condition of irradiating light: 100 Klux, filter used: D65 (capable of filtering out ultraviolet rays with wavelengths shorter than 320 nm)) is made, wherein the reflection spectrum is measured on the resin patch after each irradiation time. The measurement results are illustrated in FIG. 1. In FIG. 1, the reflection spectra obtained by measurements before the irradiation, after the 12-hour irradiation, after the 36-hour irradiation, after the 72-hour irradiation and after the 120-hour irradiation are indicated with A, B, C, D and E, respectively. Incidentally, the optical density OD and chroma c* of the resin patch before the irradiation are 0.91 and 3.9, respectively. And the optical density OD and chroma c* of the resin patch after the 120-hour irradiation are 0.88 and 5.7, respectively.

As shown in FIG. 1, the resin patch incorporating the black color material produced in Example 1 for color performance evaluations has small reflectances of the order of at most 25%, over the whole visible region (400 to 700 nm), and thereby it is ascertained that the resin patch has a sufficient blackness degree. Likewise, even after the 120-hour irradiation, the resin patch shows small reflectances of the order of at most 25% over the whole visible region, and thereby it is ascertained that the black color material produced in Example 1 has excellent light fastness.

(Light Fastness Test and Color-Difference Measurement)

Figure 2:
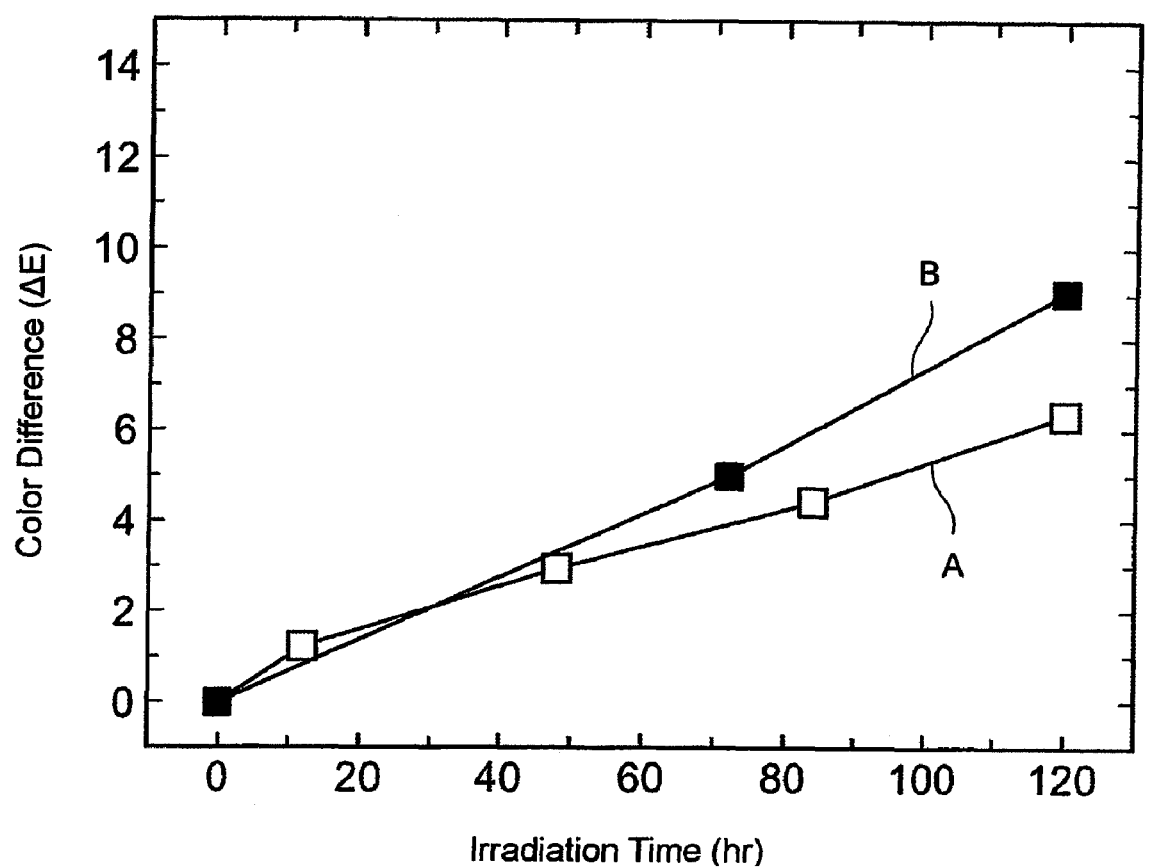
FIG. 2 displays the variations in color difference with irradiation time in the light fastness tests.

On one of the resin patches incorporating the black color material produced in Example 1 for color performance evaluations, the resin patch with TMA of 4.5 g/m² and PMA of 0.3 g/m² (corresponding to 6.7% by mass in terms of the proportion of the color material to the resin), and the resin patch made using the mixed CMY black slurry, the hue L*-value, a*-value and b*-value of each resin patch in the initial state ($L^*_1$, $a^*_1$ and $b^*_1$) are firstly determined with a spectrodensitometer (X-Rite 939, made by X-Rite, Inc.), and then the same light fastness test as mentioned above is carried out and the hue L*-value, a*-value and b*-value of each resin patch after irradiation for each given period of time ($L^*_c$, $a^*_c$ and $b^*_c$) are determined. From these values, the discoloration degree ΔE defined by the following expression (A) is calculated for each resin patch. The results obtained are illustrated in FIG. 2. Incidentally, A in FIG. 2 indicates the graph of the case where the black color material produced in Example 1 is used, and B in FIG. 2 indicates the graph of the case where the mixed CMY black is used.

$$\Delta E = \sqrt{(L*_1 - L*c)^2 + (a*_1 - a*c)^2 + (b*_1 - b*c)^2}. \qquad (A)$$

As shown in FIG. 2, though the color difference ΔE increases with increase in irradiation time because each color material suffers degradation, the increment of ΔE in the case of using the black color material produced in Example 1 is smaller than that in the case of using the mixed CMY black, whereby it is ascertained that the black color material of Example 1 has excellent light fastness.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A method for producing a black color material comprising a condensation product of a pyrrole compound represented by the following formula (1) and a squaric acid represented by the following formula (2):

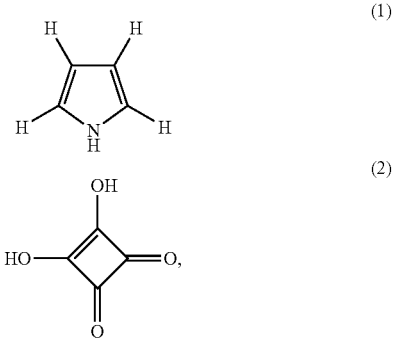

and the condensation product being in the form of fine particles having a diameter of 20 nm or more and 400 nm or less, wherein the method comprises dissolving the pyrrole compound represented by formula (1) and the squaric acid represented by formula (2) in a water-containing reaction solvent, and, adding a catalyst to the reaction mixture.

2. A toner comprising a binder resin and the black color material produced using the method as claimed in claim 1.

3. The method for producing a black color material according to claim 1, wherein the water content in the water-containing reaction solvent is 10% by mass or above and 40% by mass or below.

4. The method for producing a black color material according to claim 3, wherein the water content in the water-containing reaction solvent is 20% by mass or above and 40% by mass or below.

5. A toner according to claim 2, wherein the median diameter (d50) of the black color material is in a range of from 50 nm to 350 nm.

6. A toner according to claim 2, wherein the amount of the black color material is in a range of from 3 parts to 10 parts by mass with respect to 100 parts by mass of the binder resin.

7. A toner according to claim 2, wherein the binder resin is a polyester resin or a styrene-acrylic resin.

* * * * *